US005531661A

United States Patent [19]

Moncrief

[11] Patent Number: 5,531,661

[45] Date of Patent: Jul. 2, 1996

[54] CARRIER SLEEVE ERECTING APPARATUS AND METHOD

[75] Inventor: Frank Moncrief, Acworth, Ga.

[73] Assignee: Riverwood International Corporation, Atlanta, Ga.

[21] Appl. No.: 316,752

[22] Filed: Oct. 3, 1994

[51] Int. Cl.$^6$ .................... B31B 3/78; B31B 1/52; B65G 15/10

[52] U.S. Cl. .................... 493/313; 493/318; 493/319; 53/458; 53/566

[58] Field of Search .................... 493/309, 310, 493/312, 313, 315, 316, 317, 319, 183; 53/458, 566

[56] References Cited

U.S. PATENT DOCUMENTS

| | | | |
|---|---|---|---|
| 2,009,828 | 7/1935 | Wild | 493/319 |
| 2,873,565 | 2/1959 | Arneson | 493/309 |
| 3,300,947 | 1/1967 | Fahrenbach | 56/566 |
| 3,323,283 | 6/1964 | Johnson | 53/566 |
| 3,580,144 | 5/1971 | Renard | 493/181 |
| 3,625,505 | 12/1971 | Lense | 271/14 |
| 4,057,008 | 11/1977 | Hughes | 493/310 |
| 4,127,977 | 12/1978 | Roehn | 493/309 |
| 4,160,406 | 7/1979 | Nowacki | 493/125 |
| 4,429,864 | 2/1984 | Scarpa | 493/313 |
| 4,460,349 | 7/1984 | Charron | 493/178 |
| 4,571,236 | 2/1986 | Adams | 493/319 |
| 4,650,450 | 3/1987 | Aioula et al. | 493/310 |
| 4,750,955 | 6/1988 | Haguenier | 493/102 |
| 5,027,586 | 7/1991 | Ramaker | 583/458 |
| 5,120,295 | 6/1992 | Mosse | 493/310 |

*Primary Examiner*—Jack W. Lavinder
*Assistant Examiner*—Christopher W. Day

[57] ABSTRACT

A method and means for opening a collapsed rectilinear carrier sleeve. As the collapsed sleeve is moved through a packaging machine it is partially opened so that the leading panel extends at an angle to the horizontal. A continuous upward force is then delivered to the leading panel to cause the leading panel to pivot up about its upstream fold line until it reaches the vertical. The collapsed sleeve is partially opened by elevating side flaps connected to an upper panel to cause the upper panel to be elevated. One way of accomplishing this is to cause the upper flaps to ride up over a fixed cam surface while lower flaps connected to a lower panel move under the cam to prevent the lower panel from moving in an upward direction.

23 Claims, 5 Drawing Sheets

CARRIER SLEEVE ERECTING APPARATUS AND METHOD

FIELD OF THE INVENTION

This invention relates to a method and apparatus for erecting a collapsed article carrier to allow the resulting sleeve to be loaded with containers. More particularly, it relates to a method and apparatus capable of erecting collapsed carriers of varying sizes.

BACKGROUND OF THE INVENTION

Sleeve-type carriers are commonly used to package articles, such as beverage containers. Such a carrier is typically formed from a generally rectangular paperboard production blank which has been folded and glued by the blank manufacturer to form an interim collapsed carrier sleeve consisting of connected top, bottom and side panels and foldably attached end panel flaps. This flat interim product is comprised of two layers connected to each other by leading and trailing folds and is introduced to an automatic packaging machine which opens the semi-formed blank into sleeve shape, inserts the products to be packaged into the sleeve and forms the end panels by gluing together the end flaps.

The manner of opening collapsed carrier sleeves has been carried out in a variety of different ways, often employing lugs or other structure to push the leading folded edge of the collapsed carrier against an unyielding surface, causing the unit to fold up into sleeve form. While such methods are successful in erecting collapsed carrier sleeves, the required apparatus is often quite complicated, leading to undesirable operational and maintenance problems, and further is normally designed so that it is limited to erecting carriers of one particular size. If different size carriers are to be run, a different packaging machine designed to handle that particular size carrier often must be used, or if the same machine can be used for different size carriers, it is normally necessary to reposition all the erecting elements, which can be a very exacting and time consuming operation.

It is an object of the present invention to provide a carrier erecting system that can be employed to erect carriers of varying sizes with only minor adjustments to the apparatus. Another object is to provide such a system which is inexpensive and is simple to maintain and operate.

BRIEF SUMMARY OF THE INVENTION

In accordance with the invention, a collapsed carrier sleeve of the type discussed is moved through a packaging machine in a downstream direction and is partially opened to cause the leading panel in the lower layer of the collapsed sleeve to pivot up about its upstream fold line. Means are provided for pushing up against the leading panel of the partially open sleeve to cause the leading panel to pivot up further about the upstream fold line until the sleeve is fully open. In a preferred arrangement the means for pushing up against the leading panel comprises one or more fingers mounted on a chain which has an angled downstream run, giving it both horizontal and vertical components of movement, and the means for moving the collapsed sleeve through the machine comprises lugs or other means for pushing against the trailing fold of the collapsed sleeve.

When the invention is employed to open a collapsed carrier sleeve having end flaps extending from panels in the upper and lower layers of the collapsed sleeve, the sleeve is partially opened by engaging the upper flaps with a sloped surface or cam to raise the upper flaps relative to the lower flaps, which thus raises the connected upper panel relative to the connected lower panel. In such an arrangement the cam is vertically spaced from the support surface that supports the lower layer of the collapsed sleeve to permit the flaps of the lower panel to move beneath the cam. Further, it is preferred that means be provided for initially elevating the upper flaps to enable the upper flaps to engage the cam, an example of which is a rotating lug for pushing up against the lower surface of the upper flaps.

These and other features and aspects of the invention, as well as its various benefits, will be made more clear in the detailed description of the invention which follows.

DETAILED DESCRIPTION OF THE PREFERRED EMBODIMENT

Figure 1:
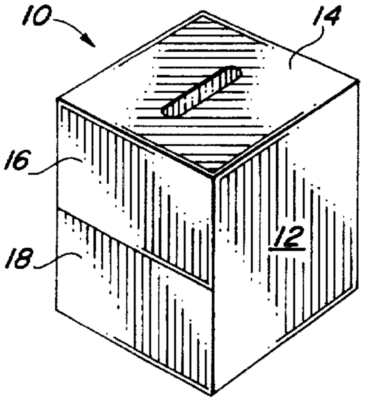
FIG. 1 is a pictorial view of a sleeve-type article carrier of the type formed from a collapsed sleeve.

Referring to FIG. 1, reference numeral 10 indicates a fully formed carrier having side panels 12 and 13, the latter panel not being visible in this view, a top panel 14, a bottom panel which is not visible in this view, and end panels consisting of flaps 16 and 18 which have been glued to dust flaps connected to the side panels. This is a typical design of sleeve-type carriers containing tall beverage bottles.

Figure 2A:
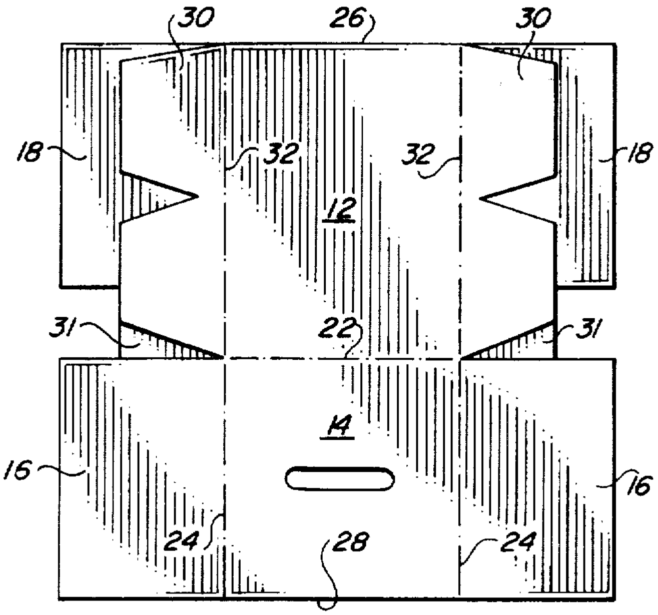
FIG. 2A is a plan view of a carrier blank which has been formed into a collapsed sleeve.
Figure 2B:
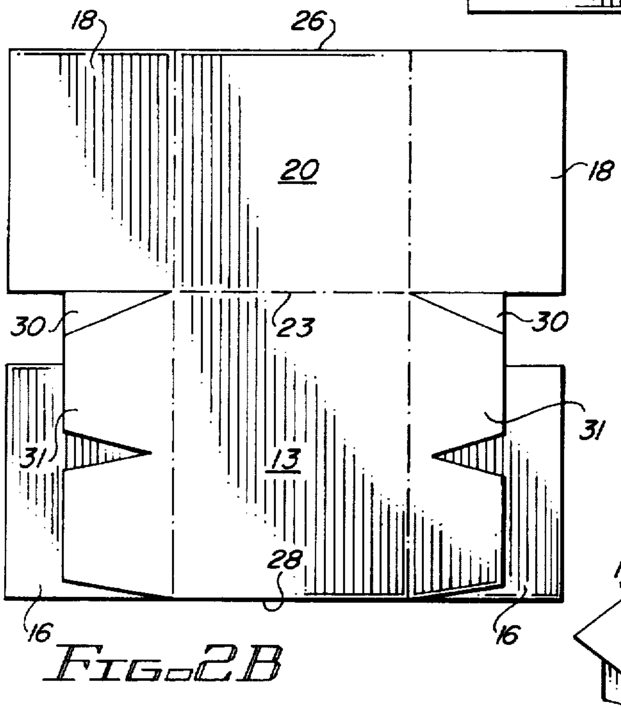
FIG. 2B is a plan view of the opposite side of the carrier blank of FIG. 2A.

Such carriers are erected from generally rectangular blanks of paperboard which are formed into collapsed sleeves of the type illustrated in FIGS. 2A and 2B, the former showing the upper side of a collapsed sleeve and the latter showing the lower side. In the view of FIG. 2A, a side panel 12, the top panel 14 and upper and lower end flaps 16 and 18, respectively, can be seen. The top panel 14 is connected to the side panel 12 by fold line 22 and the upper end flaps 16 are connected to the top panel 14 by fold lines 24. The side panel 12 is connected by fold-line 26 to the flattened bottom panel 20, shown in FIG. 2B, and top panel 14 is connected to the underlying side panel 13 by fold-line 28. The underlying side panel 13 is connected to the bottom panel 20 by a fold line 23 similar to the fold line 22 connecting the side panel 12 to the top panel 14. Also shown in FIG. 2A are dust flaps 30, which are connected by fold lines 32 to the side panel 12, and portions of the underlying dust flaps 31. FIG. 2B shows the dust flaps 31 to be foldably connected to the other side panel 13, and also shows portions of the dust flaps 30.

Figure 3:
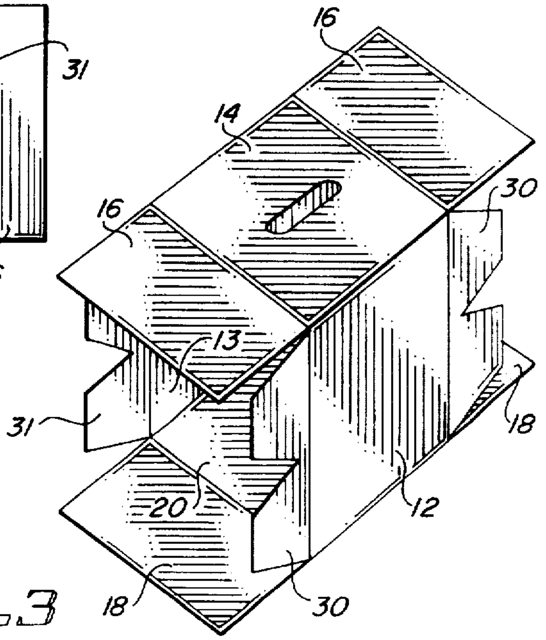
FIG. 3 is a pictorial view of the collapsed sleeve of FIG. 2 after it has been erected to sleeve form.

The collapsed sleeve is opened or erected to the rectilinear fully open condition shown in FIG. 3 prior to filling the carrier. As can be seen, the side panels 12 and 13 have been pivoted up to vertical and the top and bottom panels 14 and 20 are foldably connected to them at substantially right angles. This allows articles to be inserted through either or both ends, after which the dust flaps 30 and 31 are folded shut and the end flaps 16 and 18 glued to them, forming the carrier of FIG. 1.

Figure 4:
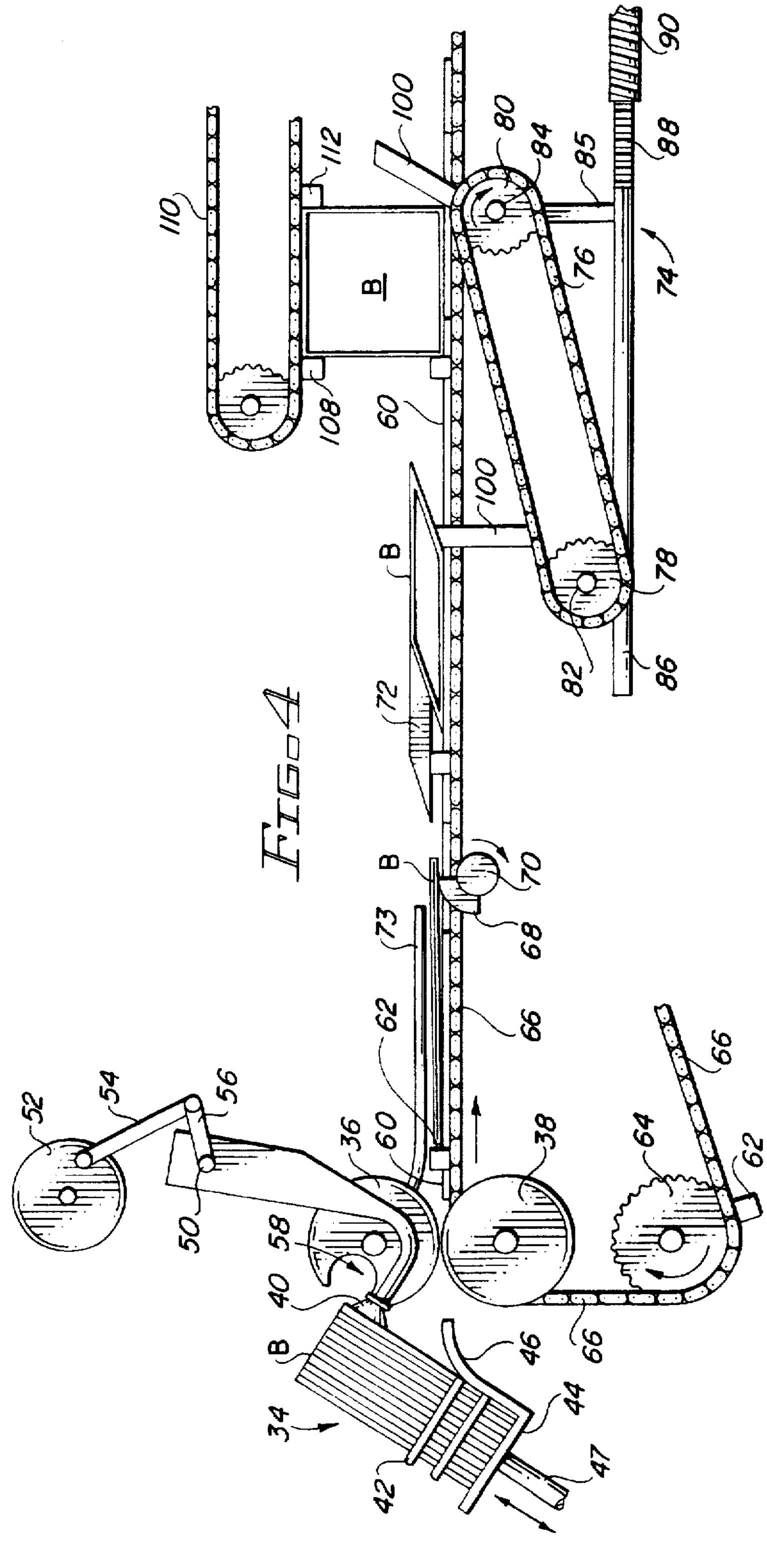
FIG. 4 is a simplified side elevation of the machine of the present invention, including a typical blank feeding mechanism.
Figure 5:
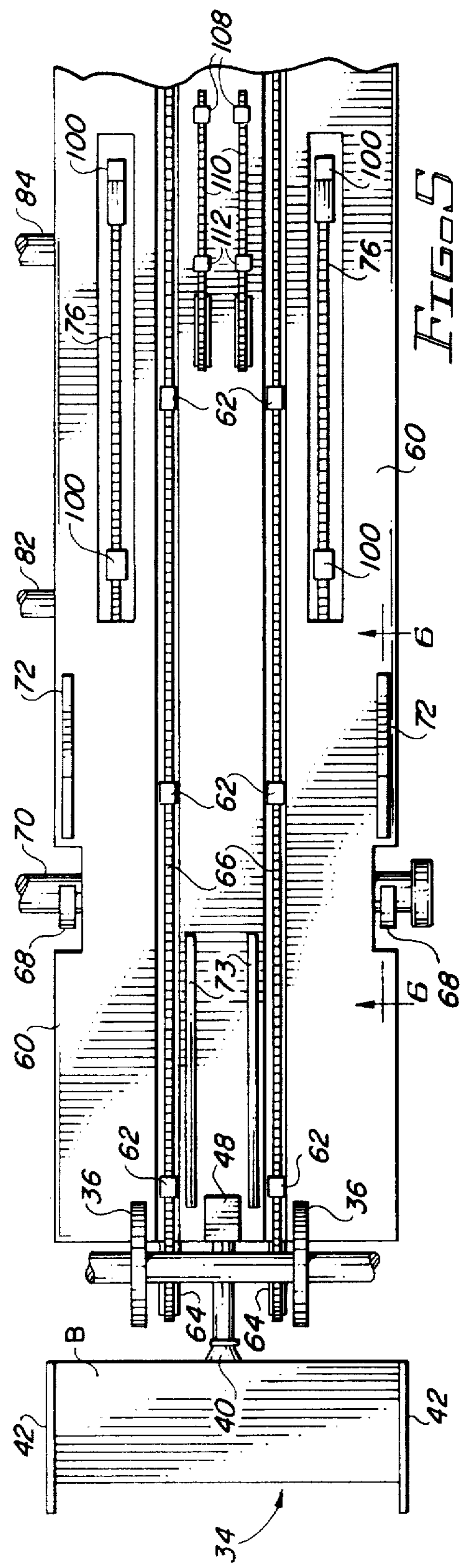
FIG. 5 is a plan view of the machine of FIG. 4, with certain elements of the machine omitted for the purpose of clarity.

The apparatus for feeding and opening collapsed carrier sleeves of the type described is shown generally in FIGS. 4 and 5. Although any desired arrangement may be employed to deliver a series of blanks to the machine, the device illustrated comprises a hopper 34 which holds a stack of collapsed sleeves B, at times referred to herein as blanks, with the lowermost blank in the stack being pulled into the nip of the powered feed rolls 36 and the freely rotating nip rolls 38 by an oscillating suction cup 40. The hopper 34 is slightly tilted in the downstream direction and includes side guide bars 42, lower support bars 44 and fingers 46 which curve forward in the downstream direction. In order to hold blanks of various sizes, the hopper may be mounted on an adjustable support 47. The vacuum cup 40 is mounted on the end of angled support arm 48 the upper portion of which is mounted on shaft 50 for movement therewith. The shaft 50 is caused to oscillate by any suitable means, such as by the illustrated crank arrangement comprised of crank wheel 52, a pivotally attached arm 54, and a pivotally attached link 56 which is secured to the shaft 50. Upon rotation of the wheel 52 the shaft 50 oscillates, causing pivotal movement of the support arm 48 and reciprocal movement toward and away from the hopper by the vacuum cup 40. At the end of its movement toward the hopper 34, the vacuum cup contacts the underside of the upper portion of the lowermost blank in the stack. As is well known, the amount of suction applied is enough to cause the blank to be pulled up over the curved fingers 46 as the vacuum cup moves away from the hopper. Although only a single vacuum cup assembly is shown, two spaced vacuum cups are often employed to ensure an adequate gripping force.

Still referring to FIGS. 4 and 5, the feed rolls 36 include cutaway portions 58. The remaining peripheral surfaces of the feed rolls engage the blanks in timed relation to the action of the vacuum cups so that when a blank is being pulled from the hopper by the vacuum cups, the feed rolls do not engage the nip rolls 38. When the vacuum cups pull the leading edge of the lowermost blank into proximity of the nip of the rolls 36 and 38, the vacuum to the cup is cut and the leading edge drops into the nip, at which time the peripheral surfaces of the feed rolls will have rotated into place to engage the leading edge portion of the blank against the nip rolls to pull the blank through the nip and onto the table or support surface 60. The peripheral surfaces of the feed rolls are of such length that they remain in contact with the blank, thus continuing to feed it, until the trailing edge of the blank is contacted by a pair of lugs 62.

Trained about sprocket wheels 64 are continuous chains 66 which carry spaced sets of the lugs 62, with the upper sprockets being mounted on the same shaft as the nip rolls 38. As illustrated in FIG. 5, the table or support surface 60 over which the blanks are pushed includes slots which allow the lugs 62 to extend up through the support surface to engage the blanks. If preferred, the support surface may be formed of spaced slats instead of a slotted integral surface to accomplish the same purpose. The lug spacing and the speed of the chains are such that the trailing edge of each blank is contacted by the next set of lugs after the blank has exited from the nip of the feed and nip rolls 36 and 38.

As can be seen in FIG. 5, and also referring back to the collapsed sleeve configuration of FIGS. 2A and 2B, the feed rolls and nip rolls are positioned to engage the blanks only on their panel sections, leaving the upper end flaps 16 of the collapsed sleeve free to move in a vertical direction away from the lower end flaps 18 of the blank. Aligned with the upper end flaps 16, but outboard of the dust flaps 30 and 31 of a blank moving through the machine, are cams or segments 68 mounted on rotating shaft 70. Just downstream from the shaft 70 are ramps or fixed cams 72 which are also located in the path of movement of the end flaps 16 and 18, and are also outboard of the dust flaps 30. Center hold-down rails 73 are vertically spaced from the table 60, extending just above the panel sections of the blanks for the purpose of maintaining control of the blank during engagement of the flaps with the cams 68 and 72, as explained more fully below. Also explained more fully below is the fact that the rotating cams 68 and the stationary cams 72 comprise an initial carrier blank erecting device. Further downstream, located beneath the support surface 60, is the final carrier sleeve erecting device 74, comprising a pair of endless chains 76 trained about sprocket wheels 78 and 80 mounted on shafts 82 and 84, respectively. The shaft 84 is powered to cause the chains to move, and the chains are located so as to be beneath the panel portions of carrier blanks moving through the packaging machine. The idler shaft 82 is mounted on a support assembly 86 which includes a vertical support 85 for supporting the shaft 84. A rack 88 connected to the support assembly 86 is positioned for operative engagement by screw 90 in order to adjust the support assembly downstream or upstream for a purpose to be explained. The carrier erector device also includes outwardly directed fingers 100 mounted on the endless chains 76 at spaced intervals.

Figure 9:
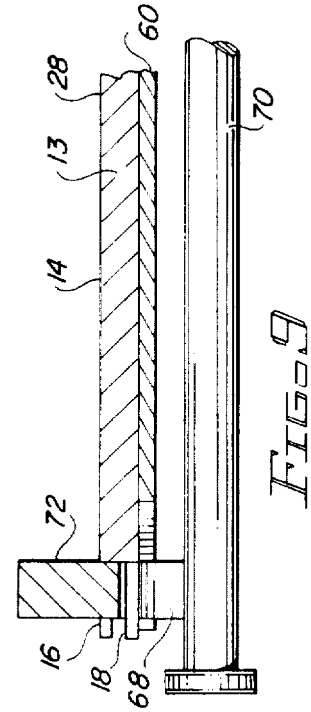
FIG. 9 is a transverse sectional view taken along line 9—9 of FIG. 8.
Figure 7:
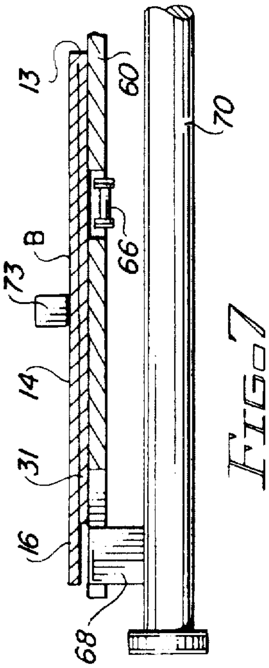
FIG. 7 is a transverse sectional view taken along line 7—7 of FIG. 6.
Figure 6:
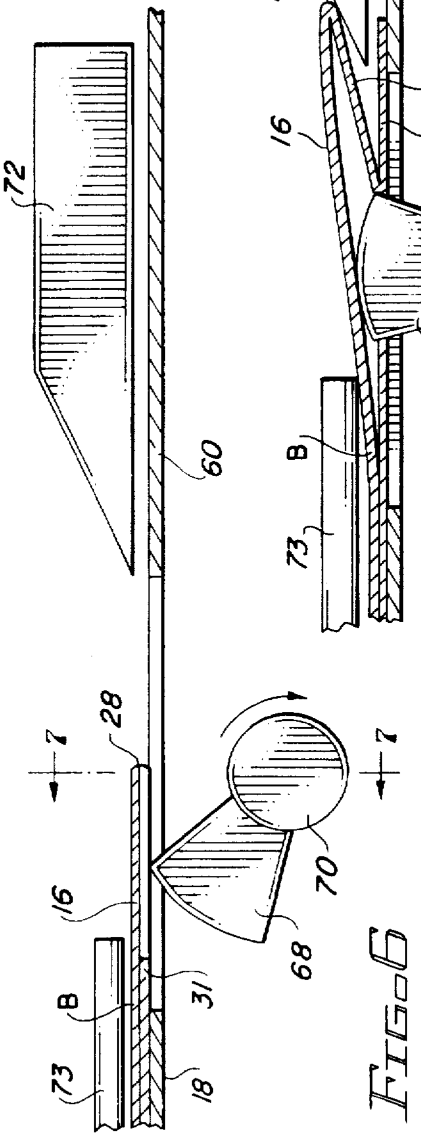
FIG. 6 is an enlarged partial sectional view, taken along line 6—6 of FIG. 5, showing details of the carrier erecting means as a carrier blank enters the initial erecting zone.
Figure 8:
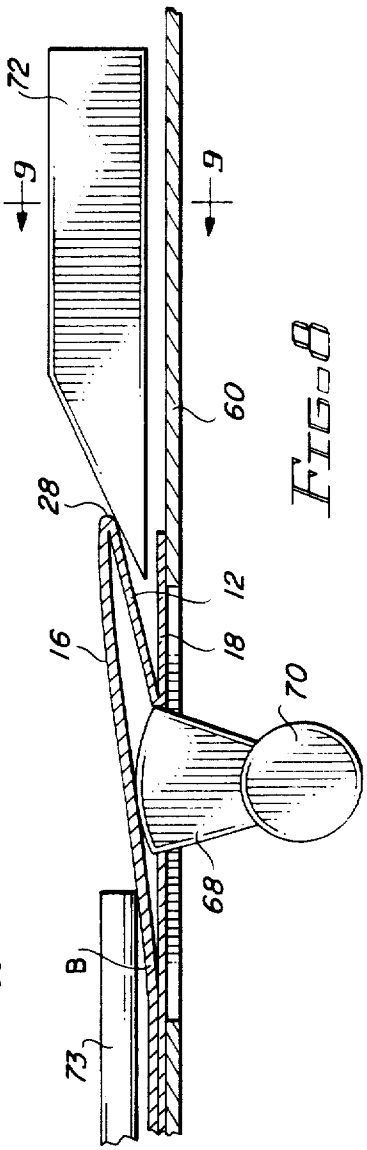
FIG. 8 is an enlarged partial sectional view similar to that of FIG. 6, but showing the carrier blank as it is leaving the initial erecting zone.

Referring now to FIGS. 6 and 7, the initial carrier erecting means is shown after the leading edge of the blank B has passed the cams 68 and the shaft 70 has been rotated to cause the cams to engage the end flaps 16. Assuming that the side of the collapsed sleeve shown in FIG. 2A is facing up as the collapsed sleeve moves through the machine and that the fold 28 is the leading edge of the blank, the cams 68 are located on the shaft 70 so as to contact the underside of the flaps 16 outwardly of the dust flaps 31. Reference to FIG. 2B makes it clear where the cams 68 have to be located in this manner in order to contact the flaps 16. As the cams 68 continue to rotate, they push up against the end flaps 16, causing the end flaps 16 and the top panel 14 connected to the end flaps 16 to be raised, resulting in the top panel 14 moving up away from the opposite lower side panel 13. This is a result of the lower side panel 13 of the carrier blank pivoting about the fold lines 28 and 23. The hold-down rails 73 prevent the blank from merely being lifted up as a unit by the cams 68 and, because they terminate short of the cams 68, the hold-down rails do not interfere with the panel movements described. The rotating cams 68 are located just upstream from the fixed cams or ramps 72, so that by the time the cams 68 have rotated to their uppermost reach, which is illustrated in FIGS. 8 and 9, the leading edges of the end flaps 16 will have reached the fixed cams 72 and will have been raised a distance sufficient to cause them to engage and ride up the sloped surface of the cams 72. The cams or ramps 72 are spaced from the support table 60 a distance which causes the end flaps 18 associated with the bottom panel 20 to move beneath the ramps while the end flaps 16 ride up their cam surfaces. This relationship is shown in FIG. 8, while FIG. 9 illustrates the relationship of the cams to the end flaps 16. It will be understood that although no structure has been shown for supporting the ramps 72 in this spaced condition, any suitable support structure may be provided as long as it does not interfere with the travel of the blanks through the packaging machine.

Figure 10:
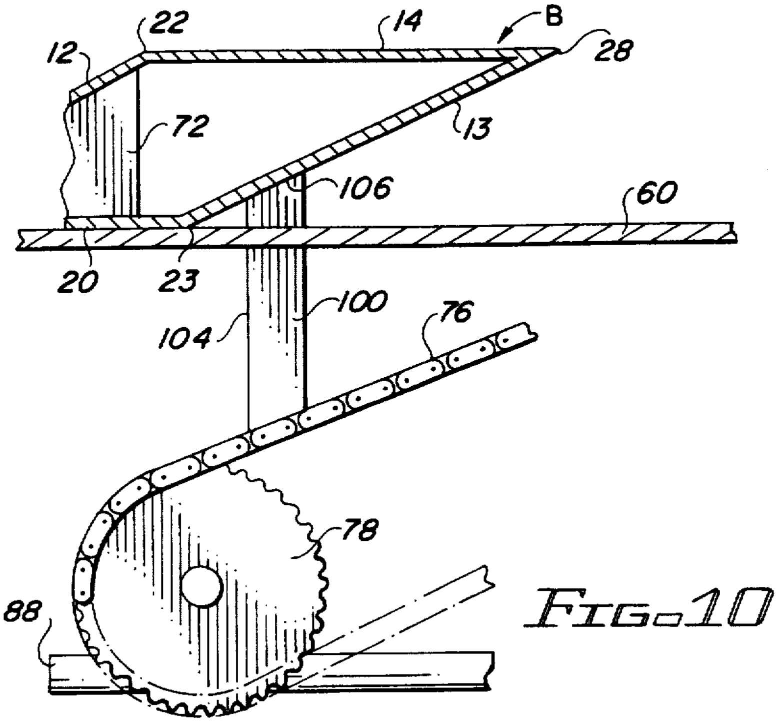
FIG. 10 is an enlarged partial sectional view showing a blank as it leaves the initial erecting cam.

As illustrated in FIG. 10, as a partially open blank B exits the cams 72, a pair of the fingers or lugs 100 carried by the chains 76 engage the leading face of the partially open carrier sleeve, which in this case is the side panel 13. The chain is angled with respect to the direction of movement of the blank, causing the fingers 100 to have both a horizontal component of movement in the downstream direction and an upward vertical component of movement. The trailing face 104 of each finger is vertically arranged and, preferably, the upper face 106 is at substantially the same angle as the panel 13 at the time of impact. As the fingers move downstream their vertical component of movement forces the panel 13 to pivot up about the fold 23 toward the vertical as the lugs 62 push the blanks downstream. Although the use of two identical chains is described, a single centrally located chain could be employed instead, provided the fingers carried by the chain are sufficiently stable and large enough to apply the amount of force needed to produce the desired carrier sleeve folding action.

This erecting mechanism is illustrated further in FIGS. 11A to 11E. The relationship of the partially open blank or carrier sleeve B to the finger 100 in FIG. 11A corresponds to the relationship shown in FIG. 10, where the finger has just contacted the blank. Note that initial contact is made with the blank while the blank is still in the partially open condition caused by the ramps 72. If contact were made while the blank is in collapsed condition, the blank would tend to simply be elevated by the finger in its collapsed form, tilting it up against the pushing lugs 62, without being folded into carrier shape.

Continued further opening of the partially open carrier sleeve occurs as a result of continued relative vertical movement of the finger 100 with respect to the panel 13. This can be seen by comparing FIGS. 11A, 11B and 11C. The sleeve is fully open when the leading panel 13 is in vertical position in full contact with the vertical trailing face 104 of the finger 100. This is illustrated in FIG. 11D. At this point lugs 108, carried by overhead chains 110, engage the upper portion of the trailing face, or panel 12, of the carrier sleeve to assist the lugs 62 in pushing the open carrier sleeve downstream while maintaining the sleeve in stable upright condition. Preferably, lugs 112, also carried by the overhead chains 110, engage the upper portion of the leading panel 13 to further assist in squaring up the carrier sleeve. As shown in FIG. 11E, the fingers 100 move around the sprocket wheel 80 after the sleeve has been fully erected, thereby permitting the sleeve to continue its downstream travel.

Figure 11A:
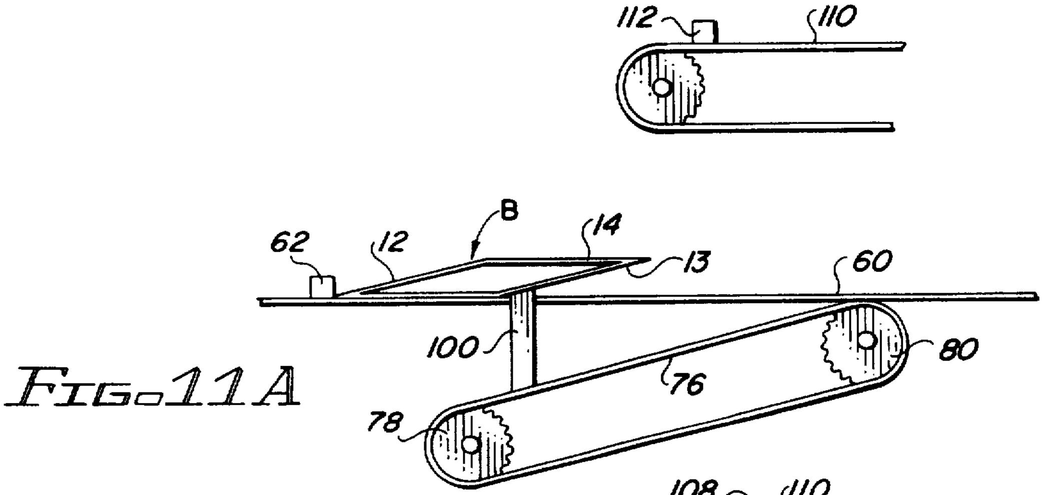
FIGS. 11A to 11E are schematic views of sequential steps in erecting an initially opened carrier sleeve by means of the present invention.
Figure 11B:
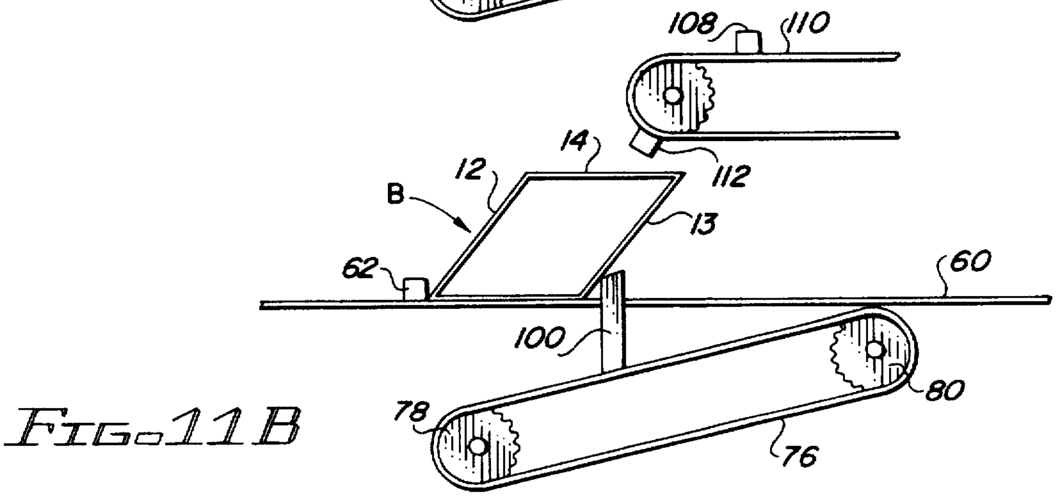
Figure 11C:
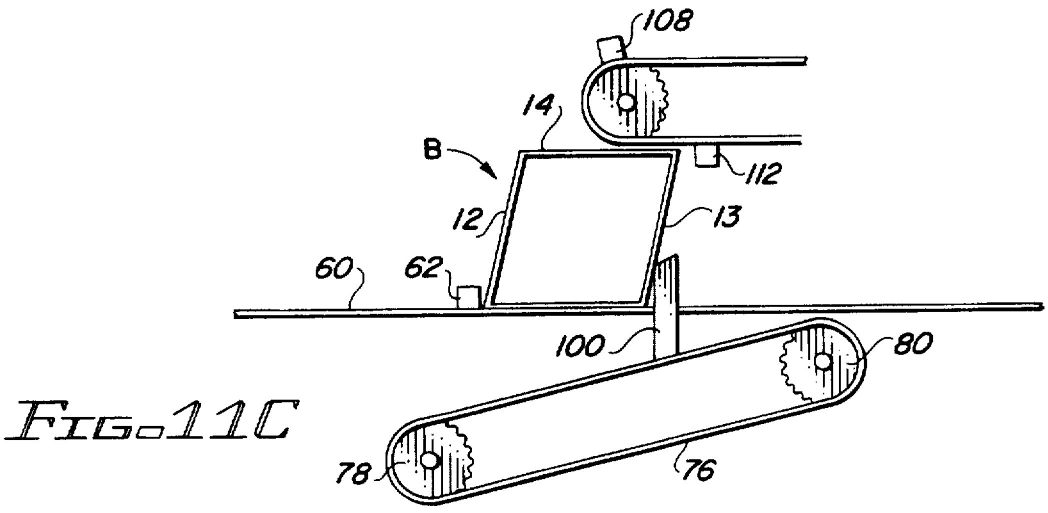
Figure 11D:
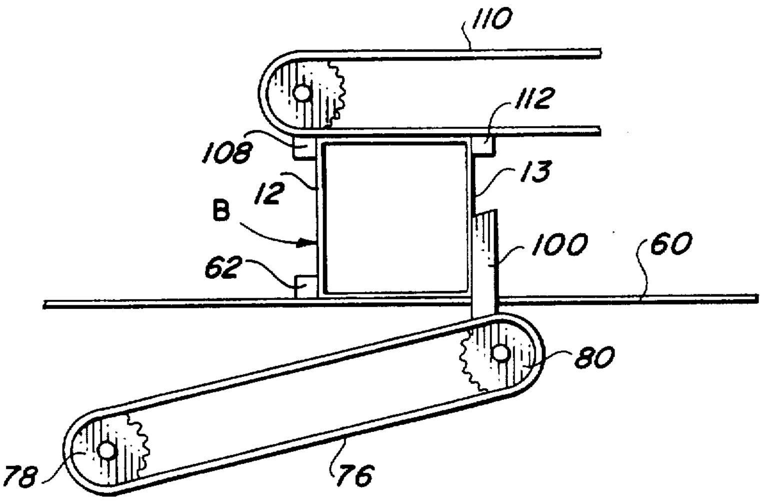
Figure 11E:
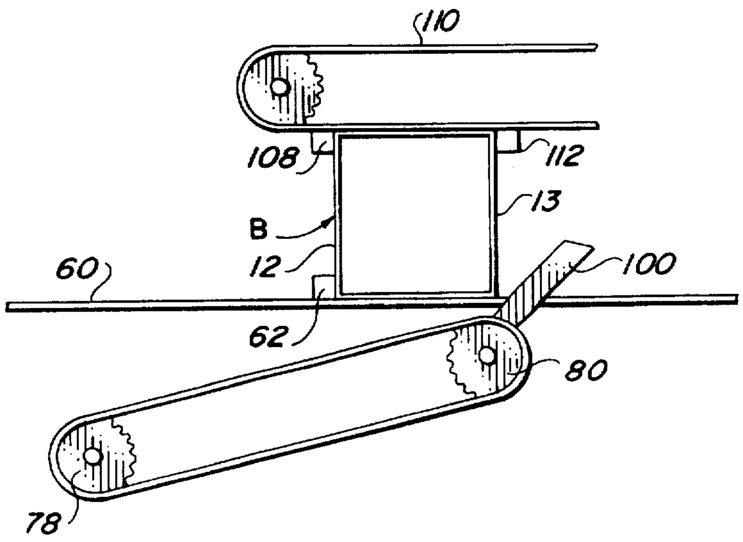

Referring to FIGS. 10 and 11A, when the fingers 100 first contact the blank B the trailing face 104 of each finger is spaced a short distance from the fold 23 of the blank. This relationship is necessary in order to initiate the desired folding action. When the blank is fully erected to rectilinear form, as illustrated in FIG. 11D, the panel 13 and the fold 23 are flush against the face 104. It is therefore necessary to move the chains 76 at a speed such that their horizontal component of movement is slower than the speed of the chains 66 by an amount that enables the fold 23 to reach the finger by the time the sleeve is fully erected.

Since the invention is not concerned with the details of the packaging machine downstream from the point shown in FIG. 11D, the structure of the machine downstream from the sleeve opening means has not been shown. Typically, however, the downstream equipment includes a loading area, where the articles to be packaged are inserted into the sleeve through one or both of its open ends, and an end closing area, where the end flaps are folded in and adhered to the dust flaps to form the end panels of the resulting carrier.

The apparatus of the invention is not only an economical, highly efficient means for opening a carrier sleeve of any particular size, it is especially useful in a machine adapted to produce carriers of varying size. If a smaller or larger carrier is to be run on the machine, it is merely necessary to move the support frame 86 either upstream or downstream of its current location so as to change the point at which the erecting fingers engage the collapsed carrier sleeve and to adjust the speed of the chains 76 accordingly. The drive unit for powering the shaft 84, not shown, should include a splined universal joint or other arrangement to permit adjustment of the assembly.

It should now be clear that the method and apparatus of the present invention provide distinct advantages over existing opening equipment and are especially desirable in connection with a packaging machine adapted to run carriers of various sizes. It should also be obvious that although a preferred embodiment of the invention has been described, it is possible to make changes to certain specific details of the preferred embodiment without departing from the spirit and scope of the invention.

What is claimed is:

1. Apparatus for opening a collapsed article carrier sleeve of the type having upper and lower layers foldably connected together when in collapsed form and being rectilinear in shape when open, the upper layer comprising an upper panel connected to a trailing panel along a first fold line, the lower layer comprising a lower panel connected to a leading panel along a second fold line, the upper panel connected to the leading panel along a third fold line and the lower panel connected to the trailing panel along a fourth fold line, the apparatus comprising:

- means for moving the collapsed carrier sleeve in a downstream direction with the third fold line facing downstream and the fourth fold line facing upstream;
- means for causing the leading panel to pivot up about the second fold line to an interim position to partially open the collapsed carrier sleeve; and
- means for contacting and pushing up against the leading panel of the partially open sleeve to cause the leading panel to further pivot up about the second fold line until the sleeve is fully open.

2. The apparatus of claim 1, wherein the means for pushing up against the leading panel comprises a finger mounted on a chain.

3. The apparatus of claim 2, including means for moving the finger out of the path of the open sleeve.

4. The apparatus of claim 2, wherein the chain is mounted at an angle so as to have a downstream run which has a horizontal component of movement and an upward component of movement.

5. The apparatus of claim 4, wherein the chain is trained about a downstream sprocket wheel located subjacent the point at which the sleeve becomes fully open.

6. The apparatus of claim 4, wherein the horizontal component of movement of the chain is slightly slower than the speed of movement of the collapsed carrier sleeves to enable the finger to initially contact the leading panel downstream of the second fold line and to substantially contact the second fold line at the time the sleeve is fully open.

7. The apparatus of claim 2, wherein the finger has a trailing face in engagement with the leading panel of the carrier sleeve when the sleeve has been fully opened, the trailing face of the finger being vertically arrranged.

8. The apparatus of claim 7, wherein the finger has an upper face for initially engaging the leading panel of the sleeve, the upper face of the finger including a sloped portion arranged at an angle to the horizontal corresponding to the angle formed with the horizontal by the leading panel of the sleeve upon initially being contacted by the sloped portion of the upper face of the finger.

9. The apparatus of claim 2, wherein the chain is mounted on a frame which is horizontally adjustable in a downstream or upstream direction.

10. The apparatus of claim 1, wherein the means for moving the collapsed carrier sleeve in a downstream direction includes means for pushing against the fourth fold line of the sleeve.

11. The apparatus of claim 10, wherein the means for pushing against the fourth fold line of the sleeve comprises lugs mounted on movable chains.

12. The apparatus of claim 1 wherein the collapsed sleeve further includes upper flaps extending from the upper panel and lower flaps extending from the lower panel, and wherein the means for causing the leading panel to pivot up about the second fold line to partially open the collapsed carrier sleeve comprises a cam for engaging the upper flaps to raise the upper flaps relative to the lower flaps to thus raise the upper panel relative to the lower panel.

13. The apparatus of claim 12, wherein the cam is vertically spaced from a support surface which supports the leading panel and the lower panel of the sleeve, the cam being located so that the lower flaps of the lower panel move beneath the cam.

14. The apparatus of claim 13, including means for initially elevating the upper flaps so as to cause the upper flaps to engage the cam.

15. The apparatus of claim 14, wherein the initial elevating means comprises means for pushing up against the lower surface of the upper flaps.

16. The apparatus of claim 15, wherein the means for pushing up against the upper flaps comprises a lug mounted on horizontal shaft extending transversely of the downstream direction of movement of the carrier sleeves.

17. A method of opening a collapsed article carrier sleeve of the type having upper and lower layers foldably connected together when in collapsed form and being rectilinear in shape when open, the upper layer comprising an upper panel connected to a trailing panel along a first fold line, the lower layer comprising a lower panel connected to a leading panel along a second fold line, the upper panel connected to the leading panel along a third fold line and the lower panel connected to the trailing panel along a fourth fold line, the method comprising:

moving the collapsed carrier sleeve in a downstream direction with the third fold line facing downstream and the fourth fold line facing upstream;

causing the leading panel to pivot up about the second fold line to an interim position to partially open the collapsed carrier sleeve; and contacting and pushing up against the leading panel of the partially open sleeve to cause the leading panel to further pivot up about the second fold line until the sleeve is fully open.

18. The method of claim 17, wherein the leading panel is pushed up by a vertically extending finger mounted for movement at an angle to the direction of movement of the collapsed carrier sleeves so as to have a downstream run comprised of a horizontal component of movement and an upward component of movement.

19. The method of claim 18, wherein the horizontal component of movement of the chain is slightly slower than the speed of movement of the collapsed carrier sleeves to enable the finger to initially contact the leading panel downstream of the second fold line and to substantially contact the second fold line at the time the sleeve is fully open.

20. The method of claim 17, wherein the collapsed carrier sleeve is moved in a downstream direction by pushing against the fourth fold line of the sleeve.

21. The method of claim 17, wherein the collapsed sleeve further includes upper flaps extending from the upper panel and lower flaps extending from the lower panel, and wherein the leading panel is caused to pivot up about the second fold line to partially open the collapsed carrier sleeve by raising the upper flaps relative to the lower flaps to thus raise the upper panel relative to the lower panel.

22. The method of claim 21, wherein the upper flaps are raised by causing the upper flaps to contact a cam vertically spaced from a support surface which supports the leading panel and the lower panel of the sleeve so that the lower flaps of the lower panel move beneath the cam.

23. The method of claim 22, wherein the upper flaps are initially elevated in order to engage the spaced cam by pushing up against the lower surface of the upper flaps.

* * * * *